United States Patent
Komnata et al.

(10) Patent No.: US 10,795,982 B2
(45) Date of Patent: *Oct. 6, 2020

(54) CAPTCHA GENERATION BASED ON ENVIRONMENT-SPECIFIC VOCABULARY

(71) Applicant: International Business Machines Corporation, Armonk, NY (US)

(72) Inventors: Konrad Wojciech Komnata, Cracow (PL); Grzegorz Piotr Szczepanik, Cracow (PL); Tomasz Hanusiak, Cracow (PL); Krzysztof Rudek, Nowy Wisnicz (PL)

(73) Assignee: International Business Machines Corporation, Armonk, NY (US)

(*) Notice: Subject to any disclaimer, the term of this patent is extended or adjusted under 35 U.S.C. 154(b) by 159 days.

This patent is subject to a terminal disclaimer.

(21) Appl. No.: 16/110,206

(22) Filed: Aug. 23, 2018

(65) Prior Publication Data

US 2020/0065466 A1 Feb. 27, 2020

(51) Int. Cl.
*G06F 21/00* (2013.01)
*G06F 21/36* (2013.01)

(52) U.S. Cl.
CPC ...... *G06F 21/36* (2013.01); *G06F 2221/2103* (2013.01); *G06F 2221/2133* (2013.01)

(58) Field of Classification Search
CPC ............. G06F 21/36; G06F 2221/2103; G06F 2221/2133

(Continued)

(56) References Cited

U.S. PATENT DOCUMENTS 8,397,275 B1* 3/2013 Magdsick ............... G06F 21/31
 380/200
9,225,531 B2* 12/2015 Hachey ................. H04L 9/3271

(Continued)

FOREIGN PATENT DOCUMENTS

CN 102317903 A 1/2012

OTHER PUBLICATIONS

Ishfaq, Hassan, Waseem Iqbal, and Waleed Bin Shahid. "Attaining accessibility and personalization with Socio-Captcha (SCAP)." 2015 12th International Bhurban Conference on Applied Sciences and Technology (IBCAST). IEEE, 2015. (Year: 2015).*

(Continued)

*Primary Examiner* — Syed A Zaidi
(74) *Attorney, Agent, or Firm* — Scott S. Dobson; Madeline F. Schiesser; Keohane & D'Alessandro, PLLC

(57) ABSTRACT

Approaches presented herein enable restricting access to a locked computing resource in a web browser with a user-tailored CAPTCHA. More specifically, a request for a CAPTCHA is obtained from a web browser of a user attempting to access a resource. A set of terms associated with the user are selected from a pool of terms collected from an environment of the user within a pre-determined time period. A familiarity value of the selected terms indicating a recognizability of the terms by the user is determined. A CAPTCHA of the selected set of terms is generated having a level of graphic noise corresponding to the familiarity value. The generated CAPTCHA is then sent to the web browser. When a response to the CAPTCHA is received from the web browser, it is analyzed to determine whether the response matches the selected set of terms. If so, the web browser is instructed to grant the user access to the resource.

14 Claims, 6 Drawing Sheets

(58) Field of Classification Search
USPC .............................................................. 726/7
See application file for complete search history.

(56) References Cited

U.S. PATENT DOCUMENTS

| | | | | |
|---|---|---|---|---|
| 2009/0138723 | A1* | 5/2009 | Nyang | G06F 21/36 713/182 |
| 2012/0131034 | A1* | 5/2012 | Kenedy | G06F 16/285 707/767 |
| 2013/0166449 | A1* | 6/2013 | Moon | G06Q 20/405 705/44 |
| 2013/0179954 | A1* | 7/2013 | Bidare | H04L 63/18 726/7 |
| 2015/0135280 | A1* | 5/2015 | Janzer | H04L 63/20 726/4 |
| 2016/0055329 | A1* | 2/2016 | Akula | H04L 63/083 726/7 |
| 2016/0057143 | A1* | 2/2016 | Carlson | G06F 21/45 726/26 |
| 2016/0248752 | A1* | 8/2016 | Blinn | H04L 63/083 |
| 2017/0048234 | A1* | 2/2017 | Lohe | H04L 63/061 |
| 2017/0316200 | A1 | 11/2017 | Jakobsson et al. | |
| 2018/0004921 | A1 | 1/2018 | McInerny et al. | |
| 2019/0018937 | A1* | 1/2019 | Jadhav | G06F 21/36 |

OTHER PUBLICATIONS

Karunathilake, A. K. B., B. M. D. Balasuriya, and Roshan G. Ragel. "User friendly line CAPTCHAs." 2009 International Conference on Industrial and Information Systems (ICIIS). IEEE, 2009. (Year: 2009).*
Wei, Te-En, Albert B. Jeng, and Hahn-Ming Lee. "GeoCAPTCHA—A novel personalized CAPTCHA using geographic concept to defend against 3 rd Party Human Attack." 2012 IEEE 31st International Performance Computing and Communications Conference (IPCCC). IEEE, 2012. (Year: 2012).*
Tasidou, Aimilia, et al. "User-centric, Privacy-Preserving Adaptation for VoIP CAPTCHA Challenges." HAISA. 2012. (Year: 2012).*
Lin, Szu-Yu, et al. "A novel approach for re-authentication protocol using personalized information." 2012 International Conference on Machine Learning and Cybernetics. vol. 5. IEEE, 2012. (Year: 2012).*
NPL Search Results (Year: 2020).*
Appendix P, "List of IBM Patents or Patent Applications Treated as Related", Mar. 18, 2020, 2 pages.

* cited by examiner

CAPTCHA GENERATION BASED ON ENVIRONMENT-SPECIFIC VOCABULARY

TECHNICAL FIELD

The present invention relates generally to Completely Automated Public Turing Test to Tell Computer and Humans Apart generation (herein referred to as CAPTCHA) and, more specifically, to generating a CAPTCHA based on environment-specific vocabulary tailored to a user in that environment.

BACKGROUND

CAPTCHA is a popular protection and security measure on many websites that uses a challenge-response test to, among other things, defend against bots and spam, as well as to ensure that any successive steps will be taken by a human user. CAPTCHAs generally require the use of three abilities simultaneously: invariant recognition (i.e., recognition of variation in the shapes of letters/numbers), segmentation (i.e., separation of each letter/number from one another), and parsing (i.e., identification based on context), which, while posing significant difficulty to a computer, usually come naturally to a human being. For example, one type of CAPTCHA technique includes presenting users with an image of some blurred, deformed, or otherwise distorted letters and/or numbers, which can be a random set of letters and/or numbers or a random set of one or more words, and requesting that the user correctly enter the letters and/or numbers into a prompt. In a different example, another CAPTCHA technique includes presenting a set of pictures to a user and instructing the user to identify and select or pick out certain objects in the pictures, such as selecting only pictures that contain street signs.

SUMMARY

Approaches presented herein enable restricting access to a locked computing resource in a web browser with a user-tailored CAPTCHA. More specifically, a request for a CAPTCHA is obtained from a web browser of a user attempting to access a resource. A set of terms associated with the user are selected from a pool of terms collected from an environment of the user within a pre-determined time period. A familiarity value of the selected terms indicating a recognizability of the terms by the user is determined. A CAPTCHA of the selected set of terms is generated having a level of graphic noise corresponding to the familiarity value. The generated CAPTCHA is then sent to the web browser. When a response to the CAPTCHA is received from the web browser, it is analyzed to determine whether the response matches the selected set of terms. If so, the web browser is instructed to grant the user access to the resource.

One aspect of the present invention includes a computer system for restricting access to a locked computing resource in a web browser with a user-tailored CAPTCHA, the computer system comprising: a memory medium comprising program instructions; a bus coupled to the memory medium; and a processor, for executing the program instructions, coupled to a user-tailored CAPTCHA generation engine via the bus that when executing the program instructions causes the system to: obtain a request for a CAPTCHA from a web browser of a user attempting to access a resource; select a set of terms associated with the user from a pool of terms collected from an environment of the user within a pre-determined time period; determine a familiarity value of the selected terms indicating a recognizability of the terms by the user; generate a CAPTCHA of the selected set of terms having a level of graphic noise corresponding to the familiarity value; and send the generated CAPTCHA to the web browser.

Another aspect of the present invention includes a computer program product for restricting access to a locked computing resource in a web browser with a user-tailored CAPTCHA, the computer program product comprising a computer readable hardware storage device, and program instructions stored on the computer readable hardware storage device, to: obtain a request for a CAPTCHA from a web browser of a user attempting to access a resource; select a set of terms associated with the user from a pool of terms collected from an environment of the user within a pre-determined time period; determine a familiarity value of the selected terms indicating a recognizability of the terms by the user; generate a CAPTCHA of the selected set of terms having a level of graphic noise corresponding to the familiarity value; and send the generated CAPTCHA to the web browser.

Still yet, any of the components of the present invention could be deployed, managed, serviced, etc., by a service provider who offers to implement passive monitoring in a computer system.

Embodiments of the present invention also provide related systems, methods, and/or program products.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

Figure 1:
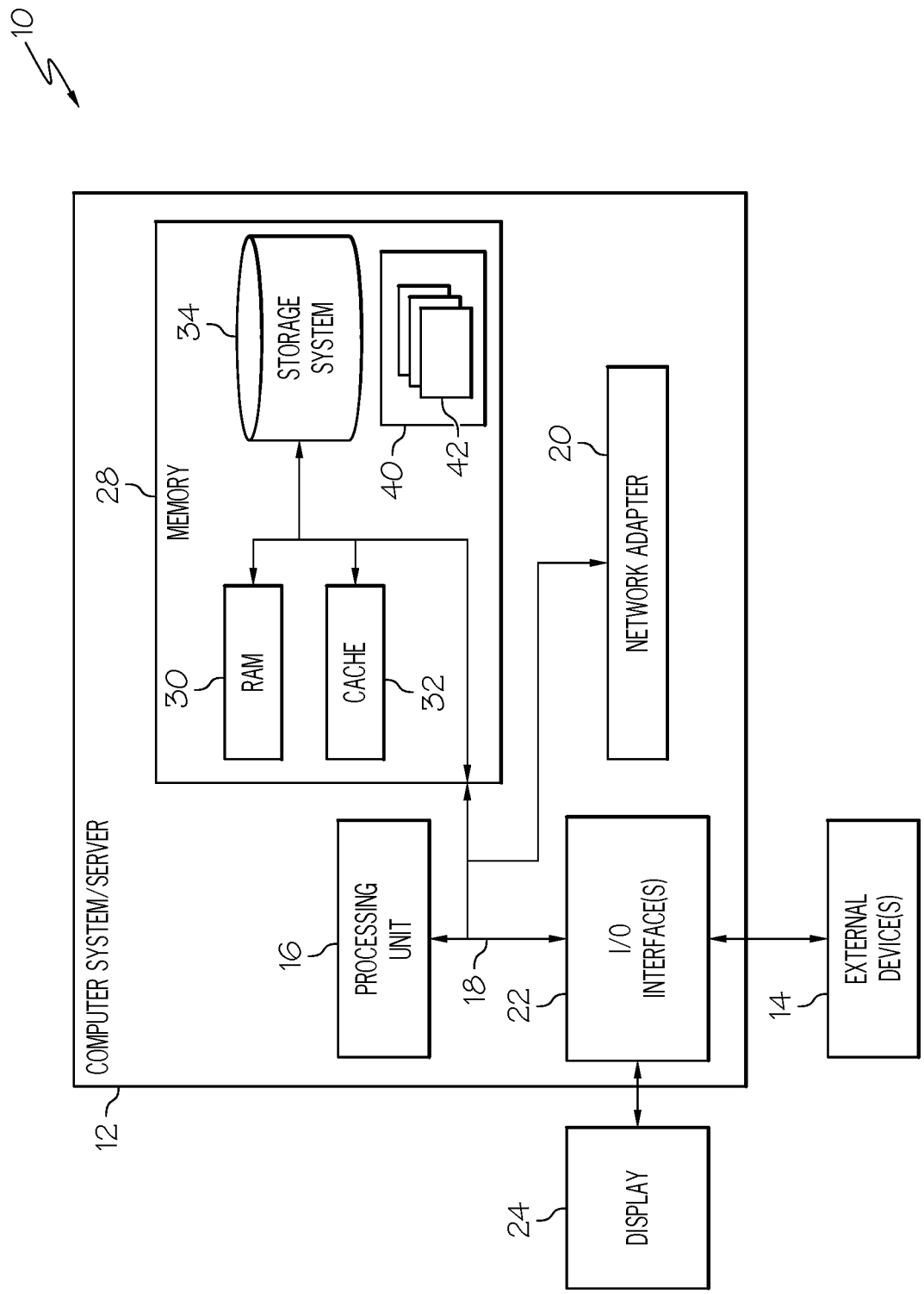
FIG. 1 shows an architecture in which the invention may be implemented according to illustrative embodiments.

The drawings are not necessarily to scale. The drawings are merely representations, not intended to portray specific parameters of the invention. The drawings are intended to depict only typical embodiments of the invention, and therefore should not be considered as limiting in scope. In the drawings, like numbering represents like elements.

DETAILED DESCRIPTION

Illustrative embodiments will now be described more fully herein with reference to the accompanying drawings, in which illustrative embodiments are shown. It will be appreciated that this disclosure may be embodied in many different forms and should not be construed as limited to the illustrative embodiments set forth herein. Rather, these embodiments are provided so that this disclosure will be thorough and complete and will fully convey the scope of this disclosure to those skilled in the art.

Furthermore, the terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. Furthermore, similar elements in different figures may be assigned similar element numbers. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Unless specifically stated otherwise, it may be appreciated that terms such as "processing," "detecting," "determining," "evaluating," "receiving," or the like, refer to the action and/or processes of a computer or computing system, or similar electronic data center device, that manipulates and/or transforms data represented as physical quantities (e.g., electronic) within the computing system's registers and/or memories into other data similarly represented as physical quantities within the computing system's memories, registers or other such information storage, transmission or viewing devices. The embodiments are not limited in this context.

As stated above, embodiments described herein provide for restricting access to a locked computing resource in a web browser with a user-tailored CAPTCHA. More specifically, a request for a CAPTCHA is obtained from a web browser of a user attempting to access a resource. A set of terms associated with the user are selected from a pool of terms collected from an environment of the user within a pre-determined time period. A familiarity value of the selected terms indicating a recognizability of the terms by the user is determined. A CAPTCHA of the selected set of terms is generated having a level of graphic noise corresponding to the familiarity value. The generated CAPTCHA is then sent to the web browser. When a response to the CAPTCHA is received from the web browser, it is analyzed to determine whether the response matches the selected set of terms. If so, the web browser is instructed to grant the user access to the resource.

Referring now to FIG. 1, a computerized implementation 10 of an embodiment for restricting access to a locked computing resource in a web browser with a user-tailored Completely Automated Public Turing test to tell Computers and Humans Apart (CAPTCHA) will be shown and described. Computerized implementation 10 is only one example of a suitable implementation and is not intended to suggest any limitation as to the scope of use or functionality of embodiments of the invention described herein. Regardless, computerized implementation 10 is capable of being implemented and/or performing any of the functionality set forth hereinabove.

In computerized implementation 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

This is intended to demonstrate, among other things, that the present invention could be implemented within a network environment (e.g., the Internet, a wide area network (WAN), a local area network (LAN), a virtual private network (VPN), etc.), a cloud computing environment, a cellular network, or on a stand-alone computer system. Communication throughout the network can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer system/server 12 is intended to demonstrate that some or all of the components of implementation 10 could be deployed, managed, serviced, etc., by a service provider who offers to implement, deploy, and/or perform the functions of the present invention for others.

Computer system/server 12 is intended to represent any type of computer system that may be implemented in deploying/realizing the teachings recited herein. Computer system/server 12 may be described in the general context of computer system/server executable instructions, such as program modules, being executed by a computer system. Generally, program modules may include routines, programs, objects, components, logic, data structures, and so on, that perform particular tasks or implement particular abstract data types. In this particular example, computer system/server 12 represents an illustrative system for restricting access to a locked computing resource in a web browser with a user-tailored CAPTCHA. It should be understood that any other computers implemented under the present invention may have different components/software, but can perform similar functions.

Computer system/server 12 in computerized implementation 10 is shown in the form of a general-purpose computing device. The components of computer system/server 12 may include, but are not limited to, one or more processors or processing units 16, a system memory 28, and a bus 18 that couples various system components including system memory 28 to processing unit 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Processing unit 16 refers, generally, to any apparatus that performs logic operations, computational tasks, control functions, etc. A processor may include one or more subsystems, components, and/or other processors. A processor will typically include various logic components that operate using a clock signal to latch data, advance logic states, synchronize computations and logic operations, and/or provide other timing functions. During operation, processing unit 16 collects and routes signals representing inputs and outputs between external devices 14 and input devices (not shown). The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 16 executes computer program code, such as program code for restricting access to a locked computing resource in a web browser with a user-tailored CAPTCHA, which is stored in memory 28, storage system 34, and/or program/utility 40. While executing computer program code, processing unit 16 can read and/or write data to/from memory 28, storage system 34, and program/utility 40.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media, (e.g., VCRs, DVRs, RAID arrays, USB hard drives, optical disk recorders, flash storage devices, and/or any other data processing and storage elements for storing and/or processing data). By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and/or an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation. Memory 28 may also have an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

The inventors of the present invention have found that traditional, randomly generated CAPTCHAs are often inefficient for a human user. Closely looking at and identifying the words or objects in the CAPTCHA takes too much time, and a CAPTCHA can be difficult for human users to respond to correctly. For example, it is estimated that it takes the average user several seconds (i.e., about 10 seconds) to correctly respond to a CAPTCHA. This means that the productivity of users whose everyday jobs require that they access resources protected by CAPTCHAs suffer. Furthermore, many providers of CAPTCHA services find themselves in a race against increasingly sophisticated automated software that may be used to break a CAPTCHA. This requires CAPTCHA service providers to develop increasingly visually challenging—and therefore increasingly difficult to understand, even for humans—CAPTCHAs. As the visual challenge of CAPTCHAs increase, so too will the time required for a human user to "solve" the CAPTCHA. Moreover, an increasing number of human-based CAPTCHA breaking services have become available, against which current providers of CAPTCHA services have been able to do little.

Accordingly, the inventors of the present invention have developed a system that tailors a CAPTCHA to a particular user by presenting the user with terms, phrases, or other material that the user has encountered recently. Therefore, the user is familiar with the terms he or she is expected to identify in the CAPTCHA. As a result, the user can quickly solve the CAPTCHA, even if the CAPTCHA is presented with a high level of visual noise or uses seemingly obscure or highly environment-specific vocabulary. The CAPTCHAs produced by embodiments of the present invention can also present non-human machines with a challenge through high levels of visual noise. Through such noise a true human user can easily spot something familiar, while the machine has no such advantage. Moreover, the CAPTCHAs produced by embodiments of the present invention that can present human-based CAPTCHA breaking services with an additional difficulty because the humans of these services will not be familiar with terminology used in the CAPTCHA, causing delays, whereas the human user for whom the CAPTCHA was intended will have no such difficulty.

Furthermore, embodiments of the present invention offer several advantages for CAPTCHA generation. More specifically, by identifying enterprise and/or environment-specific vocabulary (e.g., used by an employee or team), embodiments of the present invention can generate CAPTCHAs with sufficient visual noise to present a challenge to a machine-based CAPTCHA breaker, and with a sufficiently challenging vocabulary to present a stumbling block to a human-based CAPTCHA breaker, all while making it easy for a user for whom the CAPTCHA is intended to easily identify the phrases in the CAPTCHA and quickly solve it. As such, embodiments of the present invention offer an additional layer of sophistication to existing CAPTCHA generation techniques, without detriment to the human users for whom the CAPTCHA is intended.

Figure 2:
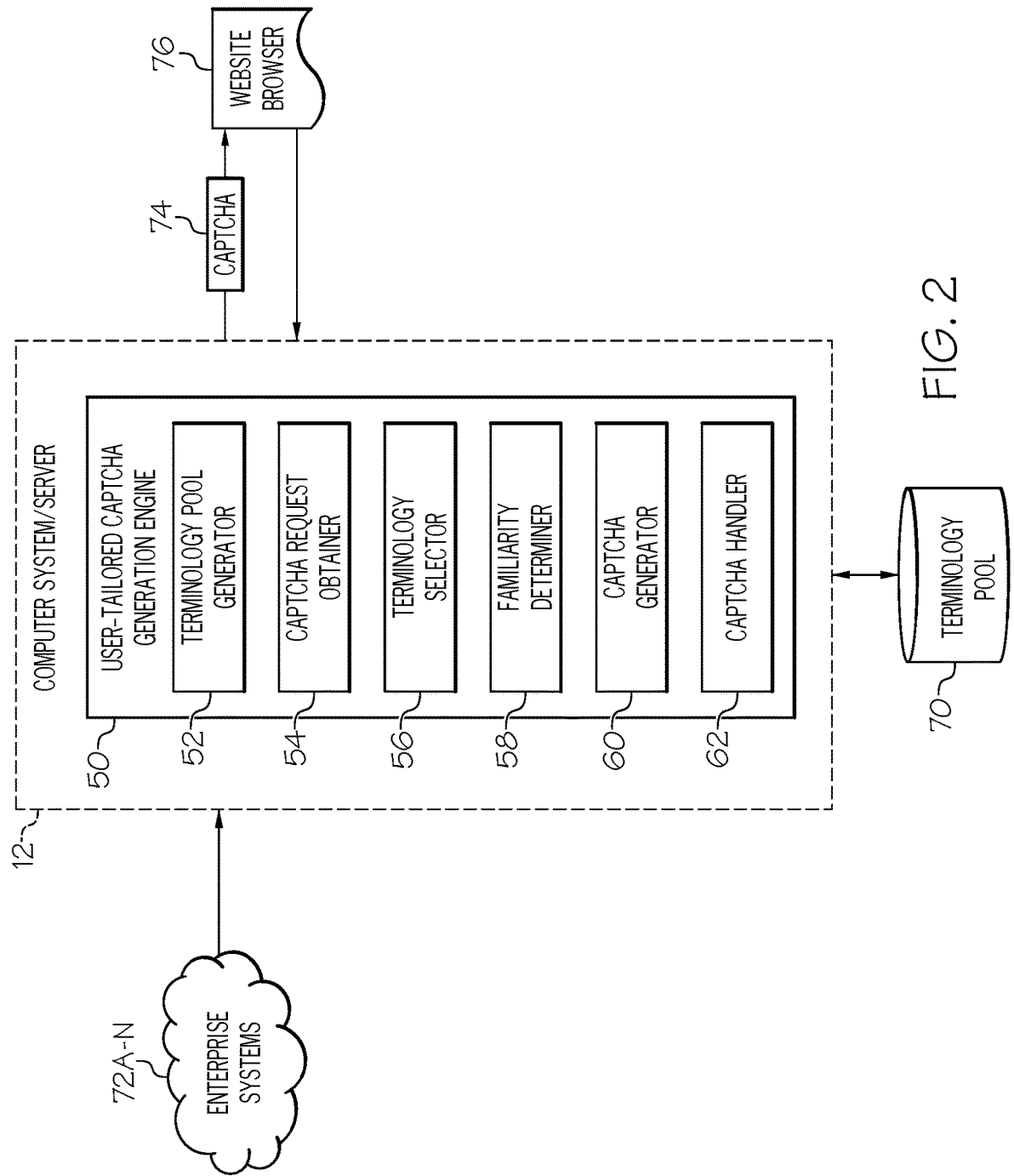
FIG. 2 shows a system diagram describing the functionality discussed herein according to illustrative embodiments.

Referring now to FIG. 2, a system diagram describing the functionality discussed herein according to an embodiment of the present invention is shown. It is understood that the teachings recited herein may be practiced within any type of computing environment, including, but not limited to, a networked computing environment (e.g., a cloud computing environment). A stand-alone computer system/server 12 is shown in FIG. 2 for illustrative purposes only. In the event the teachings recited herein are practiced in a networked computing environment, each client need not have a user-tailored CAPTCHA generation engine 50 (hereinafter "system 50"). Rather, all or part of system 50 could be loaded on a server or server-capable device that communicates (e.g., wirelessly) with the clients to provide for restricting access to a locked computing resource in a web browser with a user-tailored CAPTCHA. Regardless, as depicted, system 50 is shown within computer system/server 12. In general, system 50 can be implemented as program/utility 40 on computer system 12 of FIG. 1 and can enable the functions recited herein.

Along these lines, system 50 may perform multiple functions similar to a general-purpose computer. Specifically, among other functions, system 50 can restrict access to a locked computing resource in a web browser with a user-tailored CAPTCHA in a networked computing environment. To accomplish this, system 50 can include a set of components (e.g., program modules 42 of FIG. 1) for carrying out embodiments of the present invention. These components can include, but are not limited to, terminology pool generator 52, which monitors a set of interactions between a user and an enterprise system 72N of an enterprise associated with the user and identify environment-specific terminology in the monitored interactions; CAPTCHA request obtainer 54, which obtains a request for CAPTCHA 74 from web browser 76 of a user attempting to access a resource; terminology selector 56, which selects a set of terms associated with the user from pool of terms 70; familiarity determiner 58, which determines a familiarity value of the selected terms indicating a recognizability of the terms by the user; CAPTCHA generator 60, which generates CAPTCHA 74 of the selected set of terms having a level of graphic noise corresponding to the familiarity value; and CAPTCHA handler 62, which sends the generated CAPTCHA to the web browser.

Figure 3:
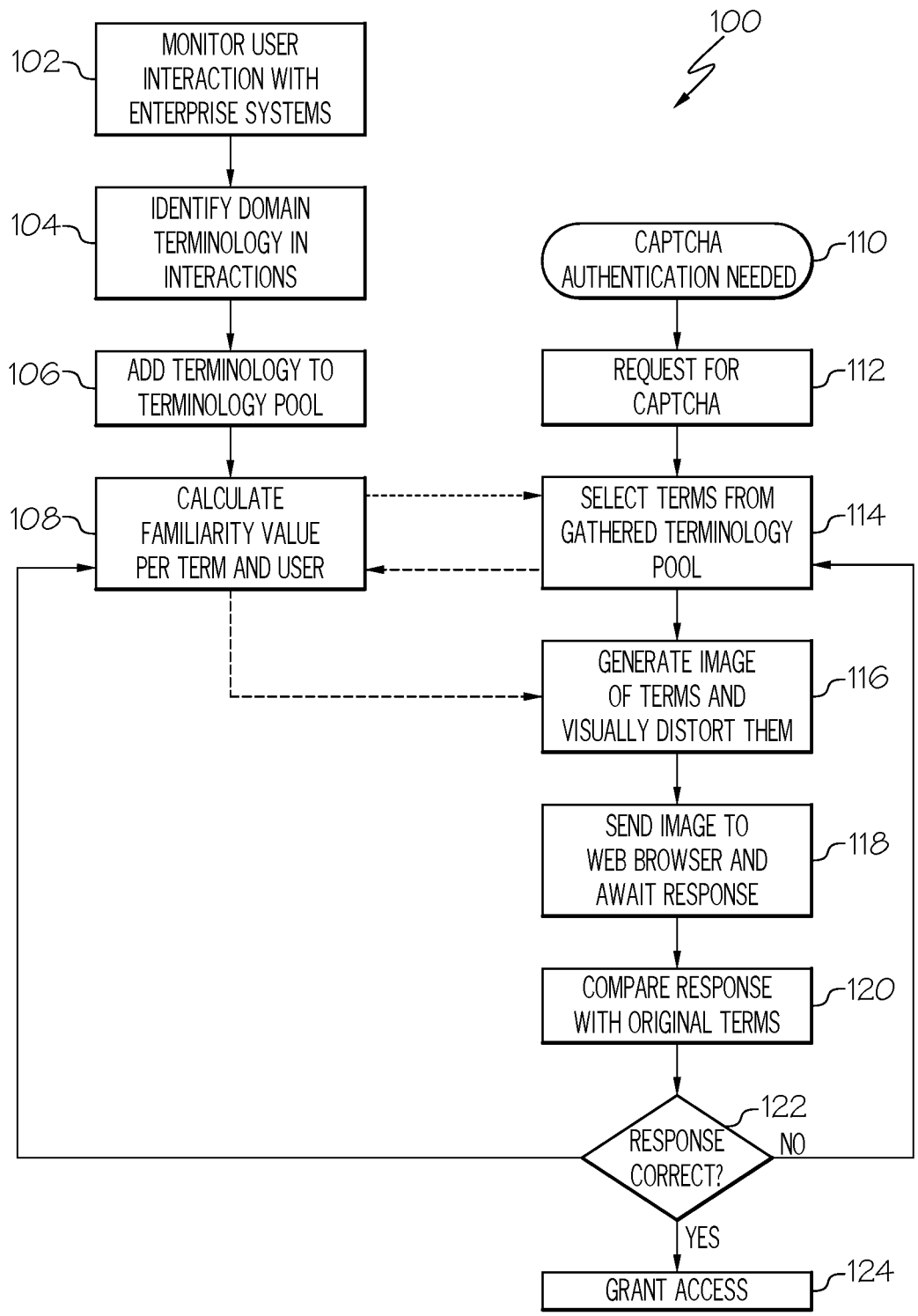
FIG. 3 shows a process flowchart for creating a dynamic-history based CAPTCHA according to illustrative embodiments.

Referring now to FIG. 3 in connection with FIG. 2, a process flowchart 100 for creating a dynamic-history based CAPTCHA is shown. According to some embodiments of the present invention, terminology pool generator 52, as performed by computer system/server 12, can monitor a set of interactions between a user and an enterprise system 72N of an enterprise associated with the user at 102. Although described here as an enterprise, it should be understood that the enterprise can be any organization, such as a business, university, research foundation, etc., that makes use of one or more computerized systems/servers of the enterprise.

Figure 4:
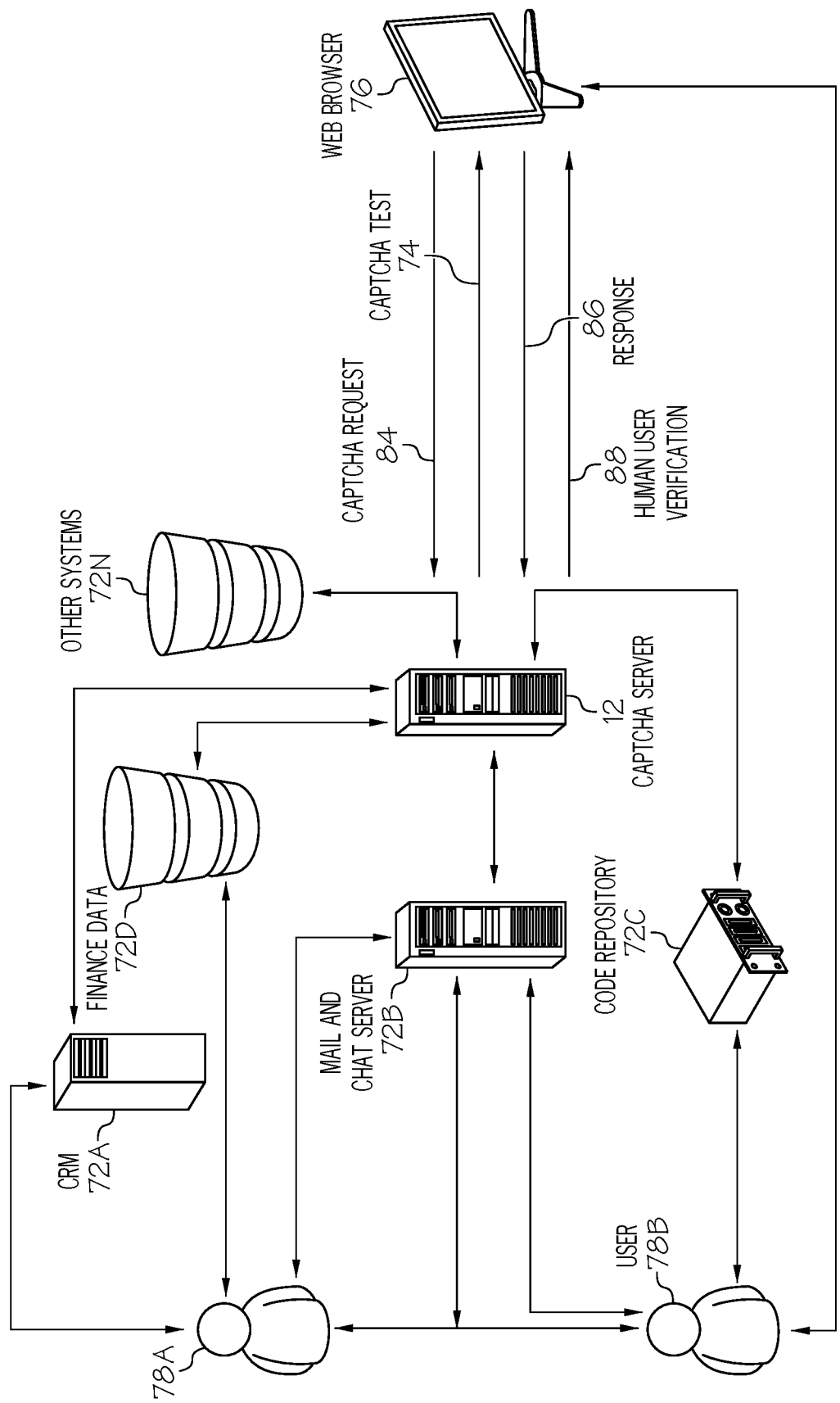
FIG. 4 shows an example of an enterprise computer system network according to illustrative embodiments.

Referring now to FIG. 4 in connection with FIG. 2 and FIG. 3, an example of an enterprise computer system network according to embodiments of the present invention is shown. As seen in FIG. 4, enterprise systems 72A-N can include, for example, systems such as a customer relationship management (CRM) system 72A, a human resources system, a mail and chat server/system 72B, a code repository 72C, a finance data repository 72D, as well as other systems 72N, such as a web browsing system (e.g., that stores web browsing history of one or more users). Although described here as individual systems, it should be understood that systems 72A-N can be implemented on a single system or across multiple systems. Furthermore, it should be understood that these systems may be physical machines maintained by the enterprise or another party on behalf of the enterprise, one or more virtual machines, or any combination thereof.

Systems 72A-N can be configured such that users 78A-B associated with the enterprise can interact with one or more of systems 72A-N. For example, user 78A may send an email to user 78B through mail and chat server 72B. In another example, user 78B can update system code for the enterprise and store this new code in code repository 72C. In still another example, user 78A may edit an invoice for a customer and store a copy of the invoice in financial data repository 72D. In any case, terminology pool generator 52 can monitor interactions of users 78A-B with systems 72A-N. As such, terminology pool generator 52 can track, copy, or record these interactions. In some embodiments, terminology pool generator 52 can write documentation of these interactions to server 12. This includes documents such as emails, chat logs, data entries, etc.

According to some embodiments, terminology pool generator 52 can perform this monitoring through a set of agents located on systems 72A-N and/or a set of agents on workstations of users 78A-B (e.g., in the case that the workstations are owned and maintained by the enterprise and users are made aware of the monitoring for the purpose of performing embodiments of the present invention). These agents can be configured to review information, such as text, words, and pictures, sent between users 78A-B and/or between a user 78 and one or more systems 72A-N. According to some embodiments, this information can be monitored in real time, that is to say at the time messages between users or to systems occur. In some other embodiments, terminology pool generator 52 can perform this monitoring periodically (e.g., hourly, daily, etc.) to gather a fresh sample of activity/interaction information for a user from a storage of one or more systems 72A-N. In still other embodiments, terminology pool generator 52 can perform this monitoring or extraction from system storage on demand, such as when generation of a CAPTCHA is requested.

Referring again to FIG. 3 in connection with FIG. 2, terminology pool generator 52, as performed by computer system/server 12, can identify environment-specific terminology in the monitored interactions at 104. This identification of terminology, phrases, vocabulary, and/or any other key words can be performed using any technique presently known or later developed. Terminology pool generator 52 can identify, in documentation between user 78 and other users or enterprise systems 72A-N, terms and phrases generated by direct actions of user 78 that are likely to be well remembered within a short time period after the activity is completed. This allows terminology pool generator 52 to identify information that user 78 knows and is likely to quickly recognize, even if presented to user 78 in visually noisy CAPTCHA 74.

Such terminology identification techniques can vary. In some embodiments, terminology pool generator 52 can use a machine learning algorithm trained on learning data to identify key words and phrases as well as terms that are likely to be memorable to a user contained within the interaction communications. In some other embodiments, terminology pool generator 52 can cross-reference the interaction communications with an environment-specific dictionary or other terms database in order to discover environment-specific vocabulary recently employed by the user. In yet another embodiment terminology pool generator 52 can filter out terms that are commonly used in everyday conversation (e.g., salutations, small talk, common nouns, pronouns, and verbs), for example using an excluded terms list or dictionary. In still other embodiments, terminology pool generator 52 can perform an analysis of the interaction communications to discover key words or phrases based on context and prominent features of the communication. For instance, content that is bold, underlined, italicized, or otherwise highlighted may be assumed to be of greater importance and therefore more likely to be memorable, environment-specific terms. In another instance, terms that are used often (e.g., in the same communication or across multiple interaction communications) can be identified as environment-specific terms. In another example, unique features about the communication, such as an addressee or a subject line may be identified as key terms. Examples of terms that terminology pool generator 52 can extract from interaction communications can include a name of a product that was delivered with an invoice in the case that the user edited that invoice or a function in code written by the user in the case that the user is a code developer.

Figure 5:
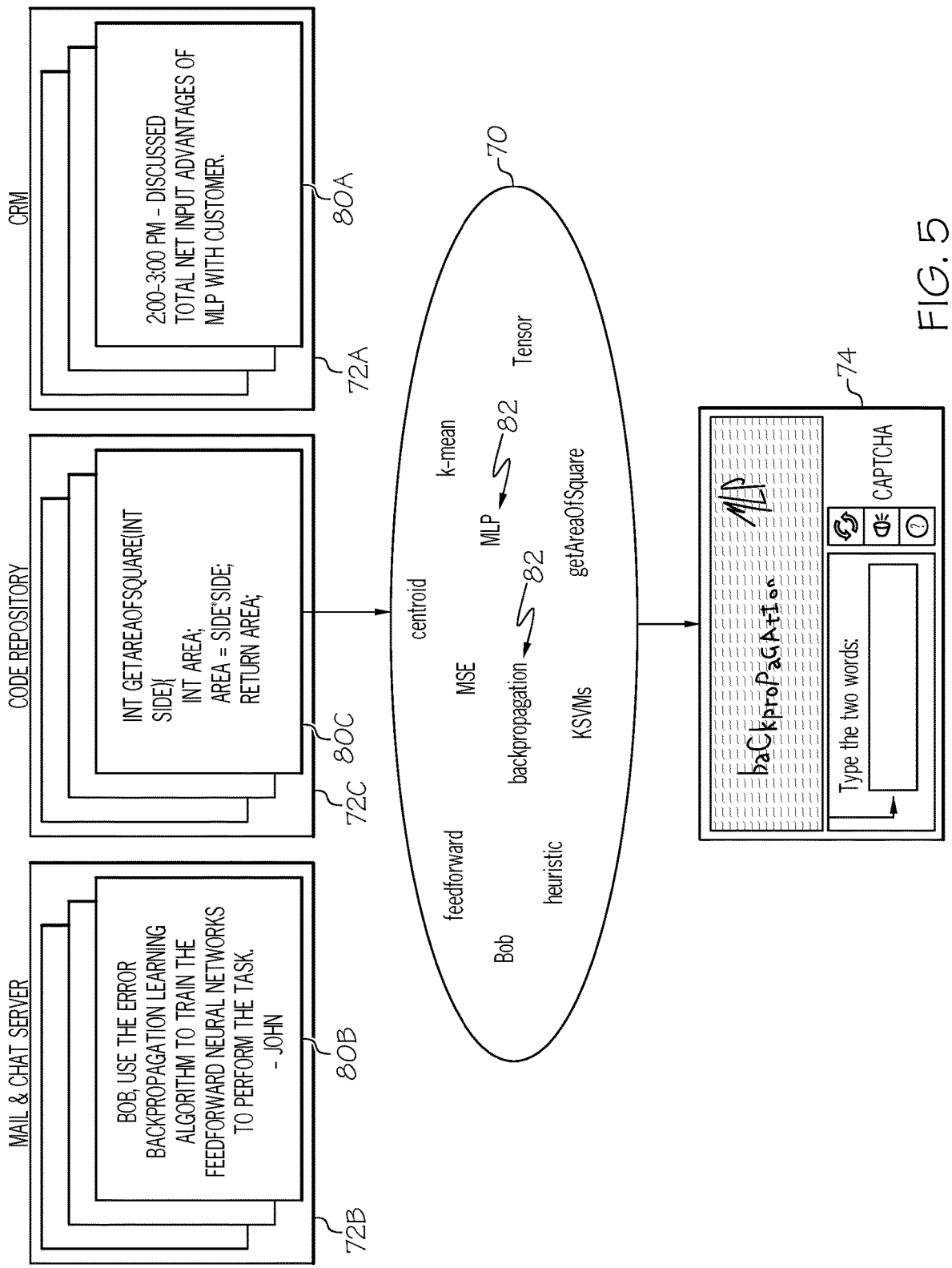
FIG. 5 shows a process flowchart for an illustrative example of restricting access to a locked computing resource in a web browser with a user-tailored CAPTCHA according to illustrative embodiments.

Referring now to FIG. 5 in connection with FIG. 2, FIG. 3, and FIG. 4, an illustrative example of restricting access to a locked computing resource in a web browser with a user-tailored CAPTCHA is shown. In the illustrative example, terminology pool generator 52 monitors CRM system 72A, mail and chat server/system 72B, and code repository 72C. The user sends an email 80B to a colleague through mail and chat server/system 72B. Terminology pool generator 52 can extract terms from email 80B, such as the name of the recipient and environment-specific vocabulary related to the user's occupation based off of a vocabulary reference document. In other examples, terminology pool generator 52 can extract a function name from an item of code 80C submitted to code repository 72C by the user. In still another example, terminology pool generator 52 can extract terms from memo 80A, such as terminology, entered into CRM system 72A.

Referring again to FIG. 3 in connection with FIG. 2, terminology pool generator 52, as performed by computer system/server 12, can associate the identified environment-specific terminology with the user and add the terminology to terminology pool 70 at 106. According to some embodiments of the present invention, terminology pool generator 52 can enter terminology associated with multiple users into one terminology pool 70, tagging each term with a tag indicating the user with which the term is associated. In instances where multiple users are associated with the same term, the term can have a tag for each associated user. These tags can be configured to expire after a predetermined time period, such as 24 hours, such that the pool of terms remains fresh with terms users employed recently and therefore are more likely to remember. In some embodiments, terms may already exist in terminology pool 70 and be tagged and untagged with one or more user tags as terminology pool generator 52 determines that the user has employed the term and then when the tag expires after a time period, respectively.

Alternatively or additionally, in some embodiments of the present invention, terminology pool generator 52 can enter terminology associated with a particular user into a terminology pool 70 devoted to the user. In this case, it may not be desirable to tag individual terms with user tags. Terminology pool generator 52 can be configured to remove terms from the pool after a predetermined time period, such as 24 hours, such that the user's pool of terms remains fresh with the terms the user employed recently and that the user is most likely to remember.

Referring again to the illustrative example of FIG. 5, terminology pool generator 52 adds the identified terms "Bob," "backpropagation," and "feedforward" from email 80B; the term "getAreaOfSquare" from code item 80C, and the term "MLP" from memo 80A to terminology pool 70. Terminology pool generator 52 further tags these terms as being associated with user 78. It should be understood that terminology pool generator 52 can protect the privacy of interaction communications by only entering individual terminology into terminology pool 70, as opposed to the entirety of the interaction communication (although that may be desirable in some embodiments). As such, the specific content of interaction communications remains private.

Referring again to FIG. 3 in connection with FIG. 2, familiarity determiner 58, as performed by computer system/server 12, can determine a familiarity value (e.g., percentage score, rank score, etc.) of the terms that indicates a recognizability of the terms by the user at 108. This familiarity value determination can be performed using any technique presently known or later developed. For example, familiarity determiner 58 can use techniques such as those employed to generate "most common words" graphs to determine the terms that a user is most likely to easily recognize and that therefore should be assigned higher familiarity values. In some embodiments, familiarity determiner 58 can evaluate the frequency (e.g., in the past day or over a longer period of time) with which the user employs a particular term in terminology pool 70. Familiarity determiner 58 could then assign a higher familiarity value to a term that was used more frequently. In some other embodiments, familiarity determiner 58 can cross-reference a term in terminology pool 70 against an information source indicating the commonality or frequency of that term in a particular environment. Familiarity determiner 58 could then assign a higher familiarity value to a term that was determined to be very commonly used in the user's environment.

In embodiments where a term in terminology pool 70 is tagged with multiple users, the familiarity value for that term may vary for different users. For example, a user that employs a particular term frequently in his system interaction communications will have a higher familiarity value for that term than a user who only employs that term infrequently. These familiarity values can be stored in terminology pool 70 as elements of the tag for each user, as additional tags on the particular term or in any other form that permits association between a term, a user, and the user's familiarity with that term.

According to some embodiments, familiarity determiner 58 can assign a familiarity value to a term in terminology pool 70 responsive to terminology pool generator adding that term to terminology pool 70 or the term being tagged with a user. Additionally or in the alternative, familiarity determiner 58 can assign a familiarity value to a term in terminology pool 70 at a later time, as will be discussed in further detail below, subsequent to a request for a CAPTCHA.

Referring again to FIG. 3 in connection with FIG. 2 and FIG. 4, at 110, a website/page or other locked/restricted resource, to which a user navigated, can require that the user authenticate/verify him/herself as a human, not a robot. According to embodiments of the present invention, web browser 76 of the user can be configured to retrieve a CAPTCHA from a local computer system/server (i.e., computer system/server 12 having user-tailored CAPTCHA generation engine 50), as opposed to a CAPTCHA provided by the website/page or other locked/restricted resource. This can be accomplished, for example, using web browser 76 specific to the same enterprise as the enterprise of enterprise systems 72A-N. The enterprise can configure the browser to route a request for human user verification through a computer system of the enterprise. Browser 76 can contain a security code, cookie, or other means to indicate that the website/page can trust web browser 76 to verify the user as human.

Referring again to FIG. 3 in connection with FIG. 2 and FIG. 4, at 112, CAPTCHA request obtainer 54, as performed by computer system/server 12, can obtain a request 84 for CAPTCHA 74 from web browser 76 of user 78 attempting to access a resource. In some embodiments, web browser 76 can transmit or otherwise send request 84 to system 50. Additionally or in the alternative, in some embodiments, request obtainer 54 can monitor user browsing history through browser 76 and detect a need 84 for user-tailored CAPTCHA 74. In any case, request obtainer 54 can determine that system 50 should generate user-tailored CAPTCHA 74 to verify user 78 as human.

Still referring to FIG. 3 in connection with FIG. 2 and FIG. 5, terminology selector 56, as performed by computer system/server 12, can select a set of terms 82 associated with user 78 from pool of terms 70 at 114. In embodiments where terminology pool 70 is a shared pool and contains terms tagged with one or more users, terminology selector 56 can filter terminology pool 70 using the tags so that only terms tagged specific to user 78 and having a usage time within a predetermined time period (e.g., within the past 24 hours) are eligible for selection. Terminology selector 56 can select any number of terms for use in CAPTCHA 74, but, in most embodiments, terminology selector 56 can be configured to select one to five terms.

In various embodiments, terminology selector 56 can select terms 82 based on any number of methodologies, such as randomized or prioritized selection. In embodiments in which terminology selector 56 selects terms 82 randomly, any algorithm that produces a random selection of eligible terms can be employed. In some other embodiments in which this selection is prioritized or weighted, terminology selector 56 can use factors such as the familiarity value of a term, the recentness with which user 78 employed the term in system interaction communications, or the recentness with which system 50 has employed the term in a CAPTCHA for the user. In embodiments in which terminology selector 56 selects terms 82 based on the familiarity value of the term, terminology selector 56 can be configured to select terms having the highest familiarity values or having familiarity values above a predetermined threshold. Selecting terms with higher familiarity values can permit system 50 to produce more secure CAPTCHAs 74 with a higher level of visual noise. For example, to access a resource, a website may require that the purportedly human user solve a CAPTCHA having at least a particular level of difficulty. As such, a CAPTCHA with at least a particular level of visual noise would be required, causing selection of terms each having a familiarity value above a threshold to permit that level of visual noise (while still being likely that the user will be able to understand the terms used therein). In embodiments in which terminology selector 56 selects terms based on the recentness with which user 78 employed the term in system interaction communications or the recentness with which system 50 has employed the term in a CAPTCHA for the user, terminology selector 56 can give more or less weight to a term based on its recentness to increase or decrease, respectively, the chances of the term being selected for use in CAPTCHA 74.

Still referring to FIG. 3 in connection with FIG. 2 and FIG. 5, familiarity determiner 58, as performed by computer system/server 12, at 108 previously or between 114 and 116, can determine a familiarity value of selected terms 82 indicating a recognizability of terms 82 by user 78. To accomplish this, familiarity determiner 58 can determine a familiarity value per term as terms are added to and/or tagged in terminology pool 70, as previously discussed above. Alternatively, to accomplish this, familiarity determiner 58 can determine a familiarity value for each selected term 82 once terms 82 have been selected, using the same techniques discussed above at 108.

According to some embodiments, when terminology selector 56 is configured to select more than one term 82, familiarity determiner 58 can determine a group familiarity value for the selected terms 82 in combination. This group familiarity value can be an average (i.e., mean, median, or mode) of the familiarity values of selected terms 82. This group familiarity value can alternatively be a weighted average of the familiarity values of selected terms 82. In such a case, for example, more weight could be assigned to terms with lower familiarity values, such that the visual noise in a resulting CAPTCHA is limited to enable user 78 to understand even the less familiar terms of the CAPTCHA.

Still referring to FIG. 3 in connection with FIG. 2 and FIG. 5, CAPTCHA generator 60, as performed by computer system/server 12, at 116 generates CAPTCHA 74 of selected set of terms 82 having a level of graphic noise corresponding to the familiarity value. According to some embodiments of the present invention, CAPTCHA 74 is an image of selected terms 82 that is visually noisy in such a manner as to make reading terms 82 by a machine difficult for the machine, but feasible for a human being. To accomplish this, visual noise is applied to the image of selected terms 82. It should be understood that the amount of noise introduced to CAPTCHA 74 varies depending on the familiarity value. This visual noise can include any type of visual noise presently known or later developed, such as blurring, variations in font style/size/capitalization, uneven type, stretching/shrinking, curved/non-linear text lines, rotated text, color variations, texture variations, overlays, etc.

In some embodiments, the amount of visual noise added to the image of selected terms 82 can be dependent on the familiarity value of one or more of the selected terms 82. As human users usually have stronger recognition capabilities when viewing already familiar words and phrases, CAPTCHA generator 60 can apply a greater intensity of visual noise (and therefore a greater level of security) to an image of a term having a higher familiarity value, creating a CAPTCHA that is more challenging for a machine to solve, but that a human user can easily recognize. In any case, this adding of visual noise to an image of selected terms 82 can be accomplished in any number of ways.

In some embodiments, an image of each term in terminology pool 70 can also be stored in terminology pool 70. This stored image can be a noisy image having a level of visual noise corresponding to the familiarity value for user 78. In embodiments where a term in terminology pool 70 can be tagged with multiple users 78, multiple noisy images of a term can be stored, each corresponding to a different familiarity value for each tagged user 78. When system 50 receives CAPTCHA request 84 for a particular user 78, CAPTCHA generator 60 can pull an image of selected term 82 tagged for user 78 that CAPTCHA generator 60 pre-generated to have a visual noise level corresponding to the user's familiarity value for that term.

In some other embodiments, CAPTCHA generator 60 can dynamically generate a noisy image of selected terms 82 responsive to CAPTCHA request 84. In this embodiment, CAPTCHA generator 60 can retrieve from terminology pool 70 a clean image of selected term 82 and the familiarity value for that term for the particular user 78. CAPTCHA generator 60 can then apply a level of visual noise to the image of selected term 82 to produce CAPTCHA 74. Alternatively or additionally, CAPTCHA generator 60 can directly generate a visually noisy image of selected term 82 (without first generating a clean image of selected term 82), in order to produce CAPTCHA 74.

In embodiments where terminology selector 56 is configured to select more than one term 82, CAPTCHA generator 60 can create an image containing the group of selected terms 82. In some embodiments, this can be accomplished by generating a composite of pre-generated noisy images of selected terms 82 pre-stored in terminology pool 70. In some other embodiments, CAPTCHA generator 60 can accomplish this by generating a clean image of selected terms 82 and applying an intensity of visual noise corresponding with a predetermined familiarity value. This predetermined familiarity value can be the group familiarity value previously determined by familiarity determiner 58, a highest or lowest familiarity value for selected terms 82, etc. In still other embodiments, CAPTCHA generator 60 can accomplish this by directly generating a noisy image of selected terms 82 having an intensity of visual noise corresponding with the predetermined familiarity value.

Still referring to FIG. 3 in connection with FIG. 2, FIG. 4, and FIG. 5, CAPTCHA handler 62, as performed by computer system/server 12, at 118 sends generated CAPTCHA 74 to web browser 76. CAPTCHA handler 62 can send out CAPTCHA 74 using any transmission means presently known or later developed. CAPTCHA handler 62 then waits for a response 86 to CAPTCHA 74. This response can include a solution to the CAPTCHA challenge, which may or may not be correct. Generally, user 78 enters a solution (e.g., by typing or speaking) into a data entry field provided, along with CAPTCHA 74, as a prompt directed at user 78. CAPTCHA handler 62 can obtain response 86 from web browser 76, for example, as a returned transmission or by pulling response 86 from web browser 76.

At 120, CAPTCHA handler 62, as performed by computer system/server 12, analyzes response 86 to determine whether response 86 matches selected set of terms 82. This matching or comparison can include comparing text purportedly entered by human user 78 against the text of selected terms 82. In some embodiments, CAPTCHA handler 62 can be configured to still identify the entered text and the text of selected term 82 as a match even if small differences exist between the two, such as different capitalization or punctuation. In any case, CAPTCHA handler 62 can be configured at 122 to determine whether response 86 solves CAPTCHA 74.

In the case that CAPTCHA handler 62 determines that there is a match, CAPTCHA handler 62 instructs web browser 76 to grant user 78 access to the resource user 78 is attempting to access at 124. This can be accomplished by sending human user verification message 88 to web browser 76. Web browser 76 may then pass this human user verification message to the resource user 78 is attempting to access, which then can grant the user access. Furthermore, in some embodiments, in response to the match, familiarity determiner 58 can increase the familiarity value of selected terms 82. This means that if any of selected terms 82 are selected again at a later time, CAPTCHA generator 60 can apply a greater intensity of visual noise to a CAPTCHA formed of those terms.

In the case that CAPTCHA handler 62 determines that there is not a match at 122, CAPTCHA handler 62 instructs web browser 76 to refuse user 78 access to the resource user 78 is attempting to access. This can be accomplished by sending a negative human user verification message to web browser 76. Web browser 76 may then pass this negative verification message to the resource user 78 is attempting to access, which then can refuse the user access. In some embodiments, responsive to a non-match, system 50 can be configured to return to 114 and select new terms for a new user-tailored CAPTCHA. Furthermore, in some embodiments, familiarity determiner 58 can be configured to decrease subsequent familiarity values for the newly selected terms, or CAPTCHA generator 60 can be configured to use a lower intensity of noise in the new CAPTCHA than was used in CAPTCHA 74.

Furthermore, in some embodiments, in response to a non-match, familiarity determiner 58 can decrease the familiarity value of selected terms 82. This means that if any of selected terms 82 are selected again at a later time, CAPTCHA generator 60 will apply a lower intensity of visual noise to a CAPTCHA formed of those terms. However, in the case that familiarity values or visual noise is decreased, system 50 can still be configured to maintain a minimum threshold of visual noise in order to prevent the level of visual noise from being driven down to a point where a machine could easily break the generated CAPTCHAs. Moreover, in some embodiments, an alert can be generated in the case that several failed attempts have been made and/or that the level of visual noise has been driven down by repeated failed attempts to the threshold.

Additionally or in the alternative, once used in CAPTCHA 74, selected terms 82 can be removed from terminology pool 70 or moved to a back of the pool or given less priority to decrease the chances of selected terms 82 being used again or used again too soon.

Figure 6:
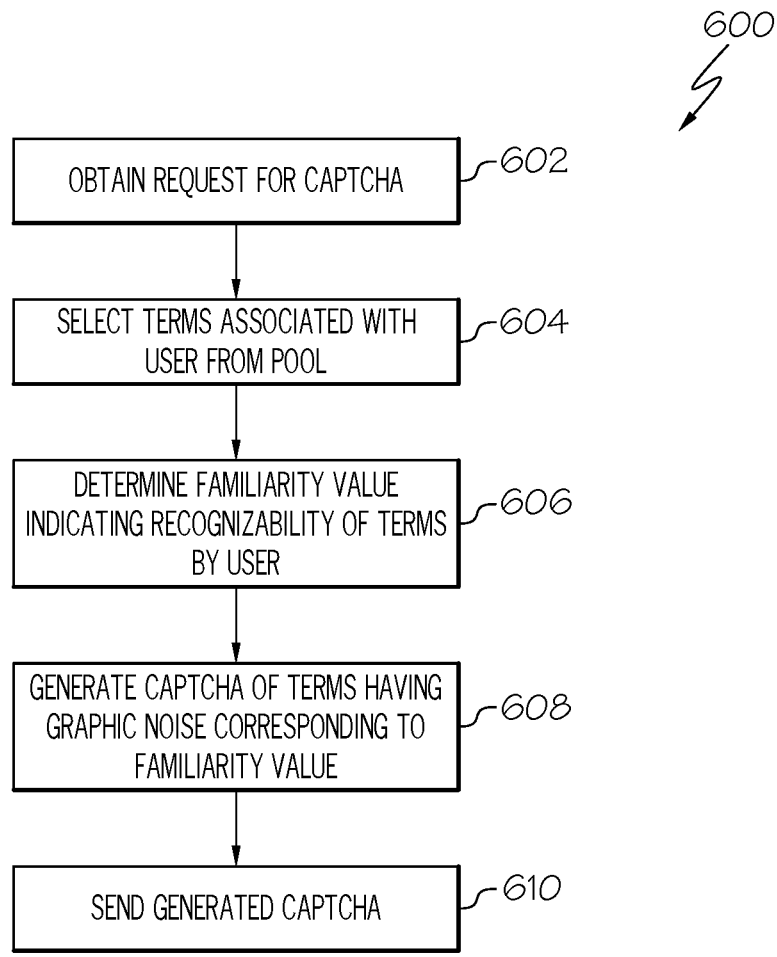
FIG. 6 shows a process flowchart for restricting access to a locked computing resource in a web browser with a user-tailored CAPTCHA according to illustrative embodiments.

As depicted in FIG. 6, in one embodiment, a system (e.g., computer system/server 12) carries out the methodologies disclosed herein. Shown is a process flowchart 600 for restricting access to a locked computing resource in a web browser with a user-tailored CAPTCHA. At 602, CAPTCHA request obtainer 54 obtains request 84 for CAPTCHA 74 from web browser 76 of user 78 attempting to access a resource. At 604, terminology selector 56 selects a set of terms associated with user 78 from pool of terms 70 collected from an environment of user 78 within a pre-determined time period. At 606, familiarity determiner 58 determines a familiarity value of the selected terms indicating a recognizability of the terms by user 78. At 608, CAPTCHA generator 60 generates CAPTCHA 74 of the selected set of terms having a level of graphic noise corresponding to the familiarity value. At 610, CAPTCHA handler 62 sends generated CAPTCHA 74 to web browser 76.

Process flowchart 600 of FIG. 6 illustrates the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, program/utility 40 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Any of the components provided herein can be deployed, managed, serviced, etc., by a service provider that offers to deploy or integrate computing infrastructure with respect to a process for restricting access to a locked computing resource in a web browser with a user-tailored CAPTCHA. Thus, embodiments herein disclose a process for supporting computer infrastructure, comprising integrating, hosting, maintaining, and deploying computer-readable code into a computing system (e.g., computer system/server 12), wherein the code in combination with the computing system is capable of performing the functions described herein.

In another embodiment, the invention provides a method that performs the process steps of the invention on a subscription, advertising, and/or fee basis. That is, a service provider, such as a Solution Integrator, can offer to create, maintain, support, etc., a process for restricting access to a locked computing resource in a web browser with a user-tailored CAPTCHA. In this case, the service provider can create, maintain, support, etc., a computer infrastructure that performs the process steps of the invention for one or more customers. In return, the service provider can receive payment from the customer(s) under a subscription and/or fee agreement, and/or the service provider can receive payment from the sale of advertising content to one or more third parties.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is apparent that there has been provided herein approaches to restrict access to a locked computing resource in a web browser with a user-tailored CAPTCHA. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A computer system for restricting access to a locked computing resource in a web browser with a user-tailored Completely Automated Public Turing test to tell Computers and Humans Apart (CAPTCHA), the computer system comprising:
    a memory medium comprising program instructions;
    a bus coupled to the memory medium; and
    a processor, for executing the program instructions, coupled to a user-tailored CAPTCHA generation engine via the bus that when executing the program instructions causes the system to:

obtain a request for a CAPTCHA from a web browser of a user attempting to access a resource;

select a set of terms associated with the user from a pool of terms collected from an environment of the user within a pre-determined time period;

determine a familiarity value of the selected terms indicating a recognizability of the terms by the user;

generate a CAPTCHA of the selected set of terms having a level of graphic noise corresponding to the familiarity value; and send the generated CAPTCHA to the web browser.

2. The computer system of claim 1, the instructions further causing the system to:

receive a response to the CAPTCHA from the web browser;

analyze the response to determine whether the response matches the selected set of terms;

instruct the web browser to grant the user access to the resource in response to a match; and instruct the web browser not to grant the user access to the resource in response to a non-match.

3. The computer system of claim 2, the instructions further causing the system to:

increase the familiarity value of the selected terms in response to the match; and decrease the familiarity value of the selected terms in response to the non-match.

4. The computer system of claim 1, the instructions further causing the system to:

monitor a set of interactions between the user and a system of an enterprise associated with the user;

identify environment-specific terminology in the monitored interactions;

associate the environment-specific terminology with the user; and add the user-associated environment-specific terminology to the pool of terms.

5. The computer system of claim 4, wherein at least one interaction of the set of interactions is selected from the group consisting of: a recent browsing history of the user, a social media profile of the user, a document processed by the user, a professional profile of the user, a message written by the user, and an entry in an information store by the user.

6. The computer system of claim 1, the instructions further causing the system to calculate the familiarity value based on a frequency of the set of terms in the pool of terms during a predetermined period of time.

7. The computer system of claim 1, the instructions further causing the system to:

generate a preliminary CAPTCHA of the selected set of terms; and adjust the level of graphic noise of the generated preliminary CAPTCHA based on the determined familiarity value to generate the CAPTCHA of the selected set of terms having the level of graphic noise corresponding to the familiarity value.

8. A computer program product for restricting access to a locked computing resource in a web browser with a user-tailored Completely Automated Public Turing test to tell Computers and Humans Apart (CAPTCHA), the computer program product comprising a computer readable hardware storage device, and program instructions stored on the computer readable hardware storage device, to:

obtain a request for a CAPTCHA from a web browser of a user attempting to access a resource;

select a set of terms associated with the user from a pool of terms collected from an environment of the user within a pre-determined time period;

determine a familiarity value of the selected terms indicating a recognizability of the terms by the user;

generate a CAPTCHA of the selected set of terms having a level of graphic noise corresponding to the familiarity value; and send the generated CAPTCHA to the web browser.

9. The computer program product of claim 8, the computer readable storage device further comprising instructions to:

receive a response to the CAPTCHA from the web browser;

analyze the response to determine whether the response matches the selected set of terms;

instruct the web browser to grant the user access to the resource in response to a match; and instruct the web browser not to grant the user access to the resource in response to a non-match.

10. The computer program product of claim 9, the computer readable storage device further comprising instructions to:

increase the familiarity value of the selected terms in response to the match; and decrease the familiarity value of the selected terms in response to the non-match.

11. The computer program product of claim 8, the computer readable storage device further comprising instructions to:

monitor a set of interactions between the user and a system of an enterprise associated with the user;

identify environment-specific terminology in the monitored interactions;

associate the environment-specific terminology with the user; and add the user-associated environment-specific terminology to the pool of terms.

12. The computer program product of claim 11, wherein at least one interaction of the set of interactions is selected from the group consisting of: a recent browsing history of the user, a social media profile of the user, a document processed by the user, a professional profile of the user, a message written by the user, and an entry in an information store by the user.

13. The computer program product of claim 8, the computer readable storage device further comprising instructions to calculate the familiarity value based on a frequency of the set of terms in the pool of terms during a predetermined period of time.

14. The computer program product of claim 8, the computer readable storage device further comprising instructions to:

generate a preliminary CAPTCHA of the selected set of terms; and adjust the level of graphic noise of the generated preliminary CAPTCHA based on the determined familiarity value to generate the CAPTCHA of the selected set of terms having the level of graphic noise corresponding to the familiarity value.

\* \* \* \* \*